United States Patent Office 3,504,050
Patented Mar. 31, 1970

3,504,050
ALKYLENE SULFIDE BLOCK INTERPOLYMERS
Riad H. Gobran, Levittown, and Stephen W. Osborn, Yardley, Pa., assignors to Thiokol Chemical Corporation, Bristol, Pa., a corporation of Delaware
No Drawing. Continuation-in-part of application Ser. No. 165,034, Jan. 8, 1962. This application July 5, 1966, Ser. No. 562,524
The portion of the term of the patent subsequent to Jan. 23, 1985, has been disclaimed
Int. Cl. C08g 23/00
U.S. Cl. 260—823     8 Claims

ABSTRACT OF THE DISCLOSURE

Disclosed herein are block interpolymers formed from alkylene sulfide monomers and processes for the preparation for such interpolymers. For example, propylene sulfide is added to a bottle containing a catalyst in solution and allowed to stand at room temperature for 3 hours by the end of which time the system became somewhat viscous. Ethylene sulfide was then charged into the bottle which was then capped and it and its contents were allowed to stand overnight under nitrogen at a temperature of approximately 27° C. A white rubbery solid powder was obtained after removal of the solvent and unreacted monomeric materials by drying overnight at 32° C./1 mm. Hg. The copolymer started to melt at 145° C. and at 184° C. had melted completely to form a clear liquid.

---

This application is a continuation-in-part of our prior applications Ser. No. 165,034 filed Jan. 8, 1962; 267,799 filed Mar. 25, 1963, now abandoned; 350,584 filed Mar. 9, 1964, now Patent No. 3,329,659; 368,382 filed May 18, 1964 which in turn is a continuation-in-part of 165,034, supra; 404,946 filed Oct. 19, 1964, now abandoned; and 511,341 filed Dec. 3, 1965, now Patent No. 3,365,431, which in turn is a continuation-in-part of our prior applications Ser. No. 162,555 filed Dec. 27, 1961, now abandoned; 274,866 filed Apr. 22, 1963, now abandoned; 168,836 filed Jan. 25, 1962, now abandoned; 352,348 filed Mar. 16, 1964, now abandoned, and 357,300 filed Apr. 3, 1964, now Patent No. 3,365,429.

This invention relates to novel block interpolymers comprising polymer chains formed from alternating different alkylene sulfide polymer segments and to processes for preparing these block interpolymers. More particularly, this invention relates to block interpolymers wherein each polymer molecule contains sequences of alkylene sulfide units alternating with sequences of other alkylene sulfide units.

Block interpolymers, as is understood in the art, constitute a linear macromolecule with two or more uninterrupted sequences of each polymeric species:

⁓ AAAAAAABBBBBBB - - - BBBBBBBAAAAAAA ⁓

"Alkylene sulfide" is used to mean any cyclic monosulfide containing two or more carbon atoms in the ring structure, i.e.

wherein R is an alkylene group containing two or more carbon atoms.

The block interpolymers of this invention possess properties superior to those of the corresponding homopolymers because they combine the advantages of their components and achieve a suitable compromise between extreme characteristics. The properties can be varied continuously over a wide range and tailored to fit the requirements for specific applications.

For example, block interpolymers are useful as plastic compositions with improved impact strength, improved processing characteristics, improved barrier properties, increased resistance to heat, solvents, and chemical attack, and improved compatibility with other materials.

Other block interpolymers are useful as elastomers with improved modulus, hardness, hysteresis, permanent set, and static compression.

The properties achieved in the particular block copolymer will depend upon the particular alkylene sulfides used to make up the different segments of the polymer, the relative amounts of these alkylene sulfides, the length of each alkylene sulfide segment, the particular polymerization catalyst used, the reaction conditions, and other like factors.

For example, polymers of ethylene sulfide having high molecular weight and a high degree of crystallinity are used to produce a wide variety of molded articles. These polymers are especially known for their excellent solvent and chemical resistance. In molded form they also have high heat distortion temperature, low water absorption properties, extremely low deformation under load and excellent dimensional stability. However, one of the problems with the ethylene sulfide polymers has been the need to modify the polymer for various specific applications without losing the many advantageous properties of the base ethylene sulfide polymer. For example, high molecular weight ethylene sulfide polymer is a relatively brittle material without flexibility. Attempts to form a random interpolymer of ethylene sulfide with other alkylene sulfides, while providing a polymer with improved flexibility, also leads to a substantial loss in solvent and chemical resistance, crystallinity, as well as a loss in many of the other desirable properties characteristic of poly(ethylene sulfide). It has been found that by forming block interpolymers composed of ethylene sulfide units and other alkylene sulfide units that some of the properties of the base ethylene sulfide polymer are improved markedly without detracting from the other properties of the base ethylene sulfide polymer.

Suitable alkylene sulfides useful in this invention are, for example, thiiranes or episulfides, such as, propylene sulfide, butylene sulfide, cyclohexene sulfide, vinyl cyclohexane sulfide, styrene sulfide, 2-benzyl thiirane, 1,2-epoxy-3,4-epithiobutane, allylthioglycidyl ether and other vicinal episulfides containing aliphatic $>C=C<$ groups such as are disclosed in U.S. Patent No. 3,222,326, tetrafluoroethylene sulfide and other halogenated episulfides such as are disclosed in U.S. Patent No. 3,136,744; and higher alkylene sulfides (alkylene sulfides having more than two carbons in the ring structure), such as, trimethylene sulfide, pentamethylene sulfide, and hexamethylene sulfide.

The alkylene sulfide polymer segments which comprise the block interpolymers of this invention comprise homopolymeric segments of alkylene sulfides or interpolymeric segments largely composed of alkylene sulfide units, but also containing minor amounts (i.e. less than about 50 mol percent of other units derived from monomers interpolymerizable with the alkylene sulfide (as disclosed in S.N. 477,288 filed Aug. 4, 1965, now abandoned) used in the particular segment of the block interpolymers.

The process of this invention is conducted by first polymerizing at least one alkylene sulfide to form an alkylene sulfide polymer segment, then adding at least one different alkylene sulfide monomer to the polymer segment of (1), and continuing the polymerization to form a block interpolymer. This process may, of course, be adapted to form block interpolymers containing two or more different alkylene sulfide polymer segments and to make various repetitions and arrangements of the different segments along the polymer chain, depending upon the properties desired in the final block interpolymer.

The stability of the alkylene sulfide block interpolymers of the present invention, under the rigorous molding temperatures commonly employed when molding such relatively high melting materials, can be improved by admixing with the polymers, as a stabilizer, about 0.5 to 2.5% by weight of the polymer of one or more amines such as octadecyl amine, branched octadecyldimethylamine and p-aminodiphenylamine, and/or one or more amide stabilizers such as nylon, acrylamide polymer and fatty acid polyamides. The stabilizer can be incorporated in the polymer by mechanically mixing it with the polymer in powder form.

These polymers may be prepared using a variety of polymerization catalysts under a variety of polymerization conditions. The most noteworthy to date, of these catalysts are certain composite materials which are the reaction product of two components. One of these components is an organometallic compound of the formula $R_2M$ wherein R is alkyl or aryl and M is a metal of Group II–B of the periodic system, i.e., zinc, cadmium or mercury.

The second component, which is reacted with the organometallic component to form the catalyst, can be generally characterized as a substance having at least one pair of unshared electrons. However, all substances falling within this broad genus do not appear to be operative. One relatively large sub-genus that has been found to be operative comprises compounds having an active hydrogen atom including, for example, water; hydrogen sulfide; primary and secondary alkylamines; e.g., methyl, ethyl and diethyl amines; alkanols, e.g., mercaptoethanol, acetone; lower fatty acids, e.g., acetic acid, and aldehydes, e.g., butyraldehyde. In addition to this sub-genus, i.e., the compounds having an active hydrogen, it has been found that useful catalysts can be prepared by employing as the second component or co-catalyst elemental oxygen or sulfur carbonyl sulfide and carbon disulfide. The preferred catalyst is the reaction product of diethylzinc and water.

These composite catalysts can be conveniently prepared by reacting the two components described above in a suitable inert liquid reaction medium, e.g., benzene, hexane, tetrahydrofuran, petroleum ether or mineral oil. The molar ratio of co-catalyst to organometallic component is preferably in the range 0.5:1 to 3:1, with the optimum ratio usually being about 1:1. The reaction temperature does not appear to be particularly critical and may vary from say $-20°$ C. to $100°$ C., with the preferred range being $20°$ to $50°$ C. It is evident that in some cases the boiling point of the liquid reaction medium will determine the upper temperature limit.

To insure optimum catalyst activity and the attainment of the highest molecular weights, the catalyst should be freshly prepared and used as soon as possible after its preparation. In some cases it will be found desirable to prepare the catalyst in the polymerization reaction vessel just prior to or coincident with the initiation of the polymerization reaction. If it is necessary to store the catalyst for an appreciable period of time before it is used, say 48 hours or more, the activity of the catalyst can best be maintained by storage at a reduced temperature.

Since both oxygen and water are active co-catalysts, any free oxygen or water present in the atmosphere or in any of the materials used is capable of modifying the properties of the catalyst. Hence in order to avoid undesired alteration of the catalyst properties, both the preparation of the catalyst and the polymerization reaction should be carried out in an environment substantially free from elemental oxygen and water, except insofar as these substances may be present as catalyst components. Catalyst preparation and polymerization are desirably carried out in an atmosphere of inert gas such as nitrogen, helium or argon. It has been found that, in general, commercially available grades of the catalyst component can be used. The liquid reaction medium used should desirably be either dried over sodium or freshly distilled.

Details of the polymerization process are given in one of the specific examples set forth below. In general the polymerization process is executed by bringing the monomer or monomers to be polymerized into contact with the catalyst prepared in the general manner described above. It is preferable, in order to obtain optimum results, that the starting monomeric materials be freshly distilled just prior to use from a reducing agent, e.g., calcium hydride, to remove oxidation products and water therefrom. The amount of catalyst used ordinarily falls within the range .05 to 3% by weight of the monomer mixture, the preferred amount of catalyst being about 0.5% by weight. The polymerization reaction can be carried out over a rather wide range of temperatures, say $-20°$ C. to $150°$ C. A typical reaction temperature is given in the specific example. This reaction time may vary from a few minutes to 48 hours or more depending upon the reaction conditions and the nature of the monomeric material.

The polymerization reaction may be conducted in any of various ways, such as in bulk without solvent, or in a solvent or emulsion, or even in the vapor phase. Solvent polymerization is preferred in most cases, and any of various solvents may be used, such as aromatic hydrocarbons, e.g., benzene, toluene or xylene; aliphatic hydrocarbons, e.g., isopentane, n-hexane or octane; chlorinated hydrocarbons, e.g., carbon tetrachloride, methylene chloride or ethylene chloride; ethers, e.g., diethyl ether, dioxane, or tetrahydrofuran.

The reaction mixture may be agitated to facilitate the reaction. The pressure at which the reaction is carried out does not appear to be particularly critical. Thus the reaction can be conducted in an open vessel at atmospheric pressure or in a closed vessel under autogenous or other pressure. In either case the reaction environment should be kept oxygen-free and water-free by the use of an atmosphere of purified inert gas for the reasons pointed out above.

The polymers produced with the catalysts and processes described above tend to be fine particle sized, fluffy powders which are difficult to handle and manipulate, particularly during the molding operations customarily employed therewith. Moldable polymers of a more granular nature and which have better handling properties may be produced using a "seed catalyst" technique. In the "seed catalyst" procedure the organometallic compound/co-catalyst material (in about a 1:1 mol ratio) is used to polymerize this episulfide monomer charge in solution at room temperature. About 0.5 to 10 mol percent catalyst is used based on the monomer charge. The solvents used are those such as tetrahydrofuran, petroleum ether, benzene and toluene. The conversion is proportional to the amount of the catalyst used and the polymer product contains, combined therewith, all the catalyst initially charged. The fluffy polymer product is then isolated and dried. This product is then compacted to form dense cakes and the cakes are then ground to form particles of less than 20 mesh in size. This granulated polymer product which contains the original charge, in the form, it is believed, of an activated zinc compound such as zinc oxide, is then used as a "seed catalyst" with which to polymerize ethylene sulfide alone or with other monomers to form granular powders. About 1 to 5% by weight of the seed catalyst is used based on the monomer charge. The seed catalyst based polymerization is conducted at elevated temperatures of about $176 \pm 5°$ F. for about one to three hours. The yields of the granular polymer obtained are about 80–100%. The seed catalyst polymer and the polymer produced therewith have essentially the same chemical characteristics and they are used in combination in subsequent molding operations without separating one from the other.

Other catalysts, which are more simple in structure, which may be used to prepare moldable, fluffy ethylene sulfide polymers include cadmium compounds such as hydroxides, sulfides, silicates, chromates, adipates, sulfates and carbonates as disclosed in S.N. 255,675 filed Feb. 1, 1963 now Patent 3,337,513; zinc or mercury compounds such as peroxides, sulfides, chromates, adipates, oxalates, oxides, hydroxides and carbonates, as disclosed in S.N. 269,774 filed Apr. 1, 1963 now Patent 3,359,248; carbonates of zinc, manganese, lead, cadmium, cobalt and nickel as disclosed in S.N. 213,015 filed July 27, 1962; oxides of metals in an integer oxidation state, i.e., valence, of not greater than IV which fall into period 3, Groups I-A, II-A, and III-A; period 4, Groups I-A, II-A and VIII; period 5, Groups II-A, IV-A, and V-A; and period 6, Groups II-A, IV-A and V-A of the periodic table of the elements. These oxides include $Na_2O$, $Na_2O_2$; MgO; $Al_2O_3$; $K_2O$; $K_2O_2$; CaO, $CaO_2$; $Fe_2O_3$; CoO; NiO; SrO, $SrO_2$; SnO, $SnO_2$; $Sb_2O_3$; BaO, $BaO_2$; PbO, $PbO_2$ and $Bi_2O_3$, as disclosed in U.S. 3,300,454. Other catalytic systems which may be used to form moldable polymers which may be stabilized according to the present invention include Friedel-Crafts catalysts such as sulfuric acid and boron trifluoride; ionizing radiation; sodium naphthenate, sodium cyanide; metal alkyls such as butyl lithium and metallic sodium dispersions.

In order to point out more fully the nature of the present invention, the following specific examples are given of illustrative methods of making the present products.

EXAMPLE I

An ethylene sulfide/propylene sulfide block copolymer was prepared as follows:

A clean 30-ounce bottle was flushed with nitrogen and charged successively with 100 ml. of benzene, 0.15 ml. (0.0083 mol) of oxygen-free water and 2 ml. of a 0.00578 mol/ml. solution of diethyl zinc in benzene, and the solution was allowed to stand at room temperature under a nitrogen atmosphere until it developed a yellow color. 50 ml. (0.64 mol) of propylene sulfide were then added to the solution, and the system was allowed to stand at room temperature for 3 hours, by the end of which time it had become somewhat viscous. 50 ml. (50.3 g., 0.84 mol) of ethylene sulfide were then charged into the bottle. The bottle was capped and it and its contents were allowed to stand overnight under nitrogen at a temperature of approximately 27° C. A solid, milky white reaction mass resulted from which 92.8 g. (95.2% yield) of a white rubbery solid powder were obtained after removing the solvent and unreacted monomeric materials therefrom by drying the reaction mass overnight at 32° C./1 mm. Hg.

The copolymer was tested to determine its melting properties. It started to melt at 145° C. and at 184° C. had melted completely to form a clear liquid. Upon cooling, the melted material formed a very flexible film. The copolymer was substantially insoluble in benzene.

EXAMPLE II

An ethylene sulfide/propylene sulfide block copolymer was prepared as follows:

A clean 30-ounce bottle was flushed with nitrogen and successively charged with 100 ml. of methylene chloride which had been dried over calcium sulfate, 0.15 ml. (0.0083 mol) of oxygen-free water and 2 ml. of a 0.00578 mol/ml. solution of diethyl zinc in benzene. The solution was allowed to stand at room temperature under nitrogen until a yellow color developed. 50 ml. (47.3 g.) of propylene sulfide were then added to the solution and the reaction system was allowed to stand at room temperature under a nitrogen atmosphere until it began to thicken, which took about 3 hours. 50 ml. (50.3 g.) of ethylene sulfide were then added to the reaction system and the bottle was capped with aluminum foil and it and its contents, under nitrogen, were allowed to stand overnight at room temperature. A solid milky white reaction mass resulted which contained some unreacted monomeric materials and the solvent physically entrapped therein. The mass was dried overnight in an oven at 52° C./1 mm. Hg to remove the solvent and monomeric materials. 88.7 g. (91% of yield) of a white solid powdery elastomeric copolymer were thereby obtained which started to melt at 156° C. and was a clear liquid at 182° C. Upon cooling, the melted materials formed a very flexible film. Using a melt vicosity device, the copolymer was extruded at 185° C. into a very flexible, wire-shaped object.

EXAMPLE III

An ethylene sulfide/propylene sulfide block copolymer was prepared as follows:

A clean 30-ounce bottle was flushed with nitrogen and successively charged with 100 ml. of benzene, 0.15 ml. (0.0083 mol) of oxygen-free water and 10.90 ml. (0.0115 mol) of a 0.001055 mol/ml. solution of diethyl zinc in benzene, and the solution was allowed to stand at room temperature under a nitrogen atmosphere until it had developed a yellow color. 15 ml. (14.2 gm., 0.192 mol) of propylene sulfide were then added to the solution, and the system was allowed to stand at room temperature under a nitrogen atmosphere for three hours. By the end of this period the reaction mixture had started to thicken. The mixture was then placed in a steel bomb. 85 ml. (85.5 g., 1.43 mol) of ethylene sulfide were then charged into the reaction system and the system was allowed to stand at room temperature under a nitrogen atmosphere overnight. The resulting white polymer was dried overnight in a vacuum oven at 1 mm. Hg to remove the solvent and unreacted monomeric materials. 91 g. (91% yield) of a white powdery copolymer were obtained which had a melting point of 190–197° C. and and average melt index at 215° C. of 0.4 g./min.

EXAMPLE IV

An ethylene sulfide/propylene sulfide block copolymer was prepared as follows:

A clean 30-ounce bottle was flushed with nitrogen and successively charged with 100 ml. of methylene chloride, 0.15 ml. (0.0083 mol) of oxygen-free water and 10.90 ml. (0.0115 mol) of a 0.001055 mol/ml. solution of diethyl zinc in benzene The solution was allowed to stand at room temperature under nitrogen until a yellow color developed. 15 ml. (14.2 g., 0.192 mol) of propylene sulfide were then added to the solution and the system was allowed to stand at room temperature under nitrogen until the solution began to thicken, which took about 3 hours. The mixture was then placed in a steel bomb. 85 ml. (85.5 g., 1.43 mol) of ethylene sulfide were then charged into the reaction system and the system was allowed to stand under nitrogen at room temperature overnight. The resulting polymeric mass was dried overnight in a vacuum oven at 1 mm. Hg to remove the solvent and unreacted monomeric materials. 90 g. (90% yield) of a white powdery copolymer were obtained which had a melting point of 190°–250° C. and an average melt index at 215° C. of 0.5 g./min.

EXAMPLE V

An ethylene sulfide/propylene sulfide block copolymer was prepared as follows:

A clean 3-neck flask was flushed with nitrogen and charged successively with 300 ml. of benzene, 0.1 ml. of oxygen-free water and 0.5 ml. of a 0.00521 mol./ml. solution of diethyl zinc in benzene, and the solution was allowed to stand at room temperature under a nitrogen atmosphere until it developed a yellow color. 10 ml. (0.13 mol) of propylene sulfide were then added to the solution, and the system was allowed to stand at 60° C. for 1 hour, by the end of which time it had become somewhat viscous. 10 ml. (10.1 g., 0.17 mol) of ethylene sulfide were then charged into the flask while stirring. The reaction was allowed to proceed for 2 hours after addition of the ethylene sulfide. A solid, milky white reaction mass resulted from which 12.9 g. (65.1%) of a tough, white rubbery solid powder were obtained after removing the solvent and unreacted monomeric materials therefrom by drying the reaction mass overnight at 32° C./1 mm. Hg. The product was extracted for 24 hours with refluxing trichloromethane. The insoluble fraction, comprising 89% of material extracted, had a melting range of from 210°–222° C. and gave an elemental analysis as follows: 41.3% carbon, 47.9% sulfur, and 7.0% hydrogen. A physical mixture of poly(ethylene sulfide) and poly(propylene sulfide) when extracted with trichloromethane separates quantitatively, thus showing the above insoluble fraction of the trichloromethane extraction to be a true block copolymer.

We claim:

1. An alkylene sulfide block interpolymer wherein said block interpolymer comprises alternating different alkylene sulfide polymer segments formed from two or more alkylene sulfide monomers selected from the group consisting of ethylene sulfide, propylene sulfide, butylene sulfide, cyclohexene sulfide, vinyl cyclohexane sulfide, styrene sulfide, 2-benzyl thiirane, 1,2→epoxy-3,4-epithiobutane, allylthioglycidyl ether, tetrafluoroethylene sulfide, trimethylene sulfide, pentamethylene sulfide, and hexamethylene sulfide.

2. A block interpolymer as in claim 1 which is formed from ethylene sulfide polymer segments and at least one other alkylene sulfide polymer segment.

3. A block interpolymer as in claim 2 wherein said other alkylene sulfide polymer segments are formed from propylene sulfide.

4. The block interpolymer of claim 1 in the form of a film.

5. The block interpolymer of claim 1 in the form of a shaped object.

6. A process for the production of an alkylene sulfide block interpolymer which comprises (1) polymerizing at least one alkylene sulfide monomer selected from the group consisting of ethylene sulfide, propylene sulfide, butylene sulfide, cyclohexene sulfide, vinyl cyclohexane sulfide, styrene sulfide, 2-benzyl thiirane, 1,2-epoxy-3,4-epithiobutane, allylthioglycidyl ether, tetrafluoroethylene sulfide, trimethylene sulfide, pentamethylene sulfide, and hexamethylene sulfide to form an alkylene sulfide polymer segment, and then (2) adding at least one different alkylene sulfide monomer selected from the aforementioned group to the polymer segment of step (1), and continuing the polymerization to form a block interpolymer.

7. A process as in claim 6 wherein said alkylene sulfide of step (1) is ethylene sulfide and said different alkylene sulfide of step (2) is propylene sulfide.

8. A process as in claim 6 which comprises repeating step (2) as many times as may be desired, except that with each repetition a different alkylene sulfide is utilized than was used in the previous step in order to form a block interpolymer with alternating different alkylene sulfide polymer segments.

References Cited

UNITED STATES PATENTS

| 2,183,860 | 12/1939 | Coltof | 260—79 |
| 3,222,324 | 12/1965 | Brodoway | 260—79 |
| 3,222,326 | 12/1965 | Brodoway | 260—79 |
| 3,225,120 | 12/1965 | Baker | 260—79 |
| 3,365,431 | 1/1968 | Gobran et al. | 260—79.7 |

FOREIGN PATENTS

| 480,077 | 1/1952 | Canada. |
| 1,363,722 | 5/1964 | France. |
| 1,371,277 | 7/1964 | France. |

OTHER REFERENCES

Reid, Organic Chemistry of Bivalent Sulphur, vol. III, pp. 13–14, 1960, Chemical Publishing Co., N.Y.

Tucker et al., Journal American Society, vol. 55, pp. 775–781, 1933.

Meadow et al., Journal American Chemical Society, vol. 56, pp. 2177–2180.

DONALD E. CZAJA, Primary Examiner

M. I. MARQUIS, Assistant Examiner

U.S. Cl. X.R.

204—159.11; 260—18, 79, 327, 459, 857